US009959897B2

(12) United States Patent
Prestenback et al.

(10) Patent No.: US 9,959,897 B2
(45) Date of Patent: May 1, 2018

(54) USER INPUT HANDLING FOR DIGITAL VIDEO PLAYBACK DEVICE

(75) Inventors: Kyle Prestenback, Burbank, CA (US); Evan Tahler, Burbank, CA (US); David Jessen, Los Angeles, CA (US); Brian Kwan, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1472 days.

(21) Appl. No.: 12/239,976

(22) Filed: Sep. 29, 2008

(65) Prior Publication Data

US 2009/0303186 A1  Dec. 10, 2009

Related U.S. Application Data

(60) Provisional application No. 61/059,679, filed on Jun. 6, 2008.

(51) Int. Cl.
*G06F 3/02* (2006.01)
*G11B 19/02* (2006.01)

(52) U.S. Cl.
CPC .................. *G11B 19/025* (2013.01)

(58) Field of Classification Search
None
See application file for complete search history.

(56) References Cited

U.S. PATENT DOCUMENTS

| 5,060,149 A | 10/1991 | Flurry et al. |
| 5,748,189 A | 5/1998 | Trueblood |
| 5,878,248 A | 3/1999 | Tehranian et al. |
| 6,069,615 A | 5/2000 | Abraham et al. |
| 6,081,855 A * | 6/2000 | deCarmo ............... G06F 9/4411 710/62 |
| 6,388,658 B1 | 5/2002 | Ahern et al. |
| 6,507,696 B1 * | 1/2003 | Chung ................. G11B 19/025 348/E5.102 |
| 6,788,815 B2 | 9/2004 | Lui et al. |
| 6,842,777 B1 | 1/2005 | Tuli |
| 7,072,945 B1 * | 7/2006 | Nieminen ............... G08C 17/02 455/41.2 |
| 7,200,857 B1 * | 4/2007 | Rodriguez et al. ............ 725/87 |
| 7,346,689 B1 | 3/2008 | Northcutt et al. |

(Continued)

FOREIGN PATENT DOCUMENTS

WO  WO 2005074565 A2 *  8/2005  ............ G08C 17/02

OTHER PUBLICATIONS

Tabuchi et al., TV Community System That Enables Users to Build and Maintain a Community Associated With the Time-Line of TV Program, NEC C&C Media Research Laboratories, vol. 99, No. 7, p. 1-29, ISSN 0919-6072.*

(Continued)

*Primary Examiner* — Ilana Spar
*Assistant Examiner* — Kirk Hermann
(74) *Attorney, Agent, or Firm* — Patent Ingenuity, P.C.; Samuel K. Simpson

(57) ABSTRACT

User inputs are received from one or more of a plurality of sources at an input interpreter agent. The plurality of sources comprises a remote control device and an on-screen keyboard application. The received user inputs are provided to a digital video object player application, wherein the input interpreter agent is separate from the digital video object player application.

21 Claims, 7 Drawing Sheets

(56) References Cited

U.S. PATENT DOCUMENTS

| | | | |
|---|---|---|---|
| 2001/0031665 A1* | 10/2001 | Taho | A63F 13/10 463/43 |
| 2002/0087996 A1* | 7/2002 | Bi et al. | 725/89 |
| 2003/0001742 A1* | 1/2003 | Eshelman et al. | 340/573.1 |
| 2003/0079055 A1 | 4/2003 | Chen | |
| 2004/0019395 A1* | 1/2004 | Maymudes | G05B 15/02 700/65 |
| 2004/0022520 A1* | 2/2004 | Kinzer | A63F 3/00006 386/241 |
| 2004/0024610 A1* | 2/2004 | Fradkov et al. | 705/1 |
| 2004/0152493 A1* | 8/2004 | Phillips et al. | 455/567 |
| 2006/0200526 A1* | 9/2006 | Cina | 709/206 |
| 2007/0210908 A1* | 9/2007 | Putterman et al. | 340/506 |
| 2008/0082604 A1* | 4/2008 | Mansour et al. | 709/203 |
| 2008/0216022 A1* | 9/2008 | Lorch et al. | 715/847 |
| 2009/0153475 A1* | 6/2009 | Kerr et al. | 345/157 |

OTHER PUBLICATIONS http://dictionary.reference.com/browse/keyboard, Oct. 17, 2011.*

Merriam Webster dictionary definition of device, www.merriam-webster.com/dictionary/device, p. 1.*

Dictionary.com definition of distinct, www.dictionary.com/browse/distinct, p. 1.*

Dictionary.com definition of format, www.dictionary.com/browse/format, p. 1.*

"Accessible User Interface Framework for Severely Physically Disabled People", http://www.springerlink.com/content/t5v84g1j71g38858, abstract only, 2006, 2 pages, obtained Sep. 29, 2008.

"Abstract interaction tools: a language for user interface management systems" http://portal.acm.org/citation.cfm?doid=42190.42191, abstract only, Apr. 1988, 6 pages, obtained Sep. 29, 2008.

* cited by examiner

USER INPUT HANDLING FOR DIGITAL VIDEO PLAYBACK DEVICE This patent application claims benefit of and priority to U.S. Provisional Patent Application 61/059,679, filed Jun. 6, 2008, and titled "User Input Handling for Digital Video Playback Device", and which is incorporated in its entirety by reference herein.

FIELD

Subject matter disclosed herein may relate to providing user inputs, such as, for example, text from a keyboard, to an application executed on a digital video object playback device.

BACKGROUND

Digital video media continue to increase in popularity. For example, optical video discs may provide very high quality images and audio, and may provide a wide range of content, such as, for example, motion pictures. Such discs may be played by electronic devices, such as, for example, stand-alone video playback devices that may provide video and audio signals to televisions, receivers, and/or a number of other audio/visual components. Such electronic devices may also feature connections to networks such as the Internet. Motion picture distribution companies, sometimes referred to as studios, as well as other content providers, may be interested in providing additional features on discs and/or other media to entice consumers to purchase, rent, or otherwise view their digital video content.

DETAILED DESCRIPTION

As discussed above, motion picture studios, as well as other content providers, may be interested in providing features and/or applications on discs and/or other media along with the movies to entice consumers to purchase, rent, and/or otherwise view their digital video content. For some of these features, it may be desirable to receive inputs from a user, such as, for example, text for a messaging application, to name but one example: Other types of inputs that may be advantageous to receive from a user may include, but are not limited to, playback commands, joystick commands, pointing device commands, etc., to name but a few examples.

It may further be advantageous to provide a range of techniques by which the user may provide the inputs in order to make it convenient and/or easy for the user. For one or more embodiments, such techniques may include, for example, the use of a hardware keyboard, navigating a software based on-screen keyboard using an infra-red remote control, and/or accessing a web page to enter inputs that may be transmitted to an appropriate electronic device. For another example, a system for accepting inputs from a user may include a phone system whereby a user may utilize a telephone to enter text or other information that may be transmitted to an appropriate electronic device. For one or more embodiments where the user may utilize a remote control to provide inputs, a "triple-tap" text entry mode may be used. The term "triple-tap" refers to a method typically found on push-button telephones where, for example, two taps of the "2" button signify the letter "b" and where three taps of the "5" button signify the letter "l". For a further embodiment, a "predictive text" technique may be utilized. For example, if a user presses the "4" button two times, it may be assumed that the word "hi" is intended by the user.

Figure 1:
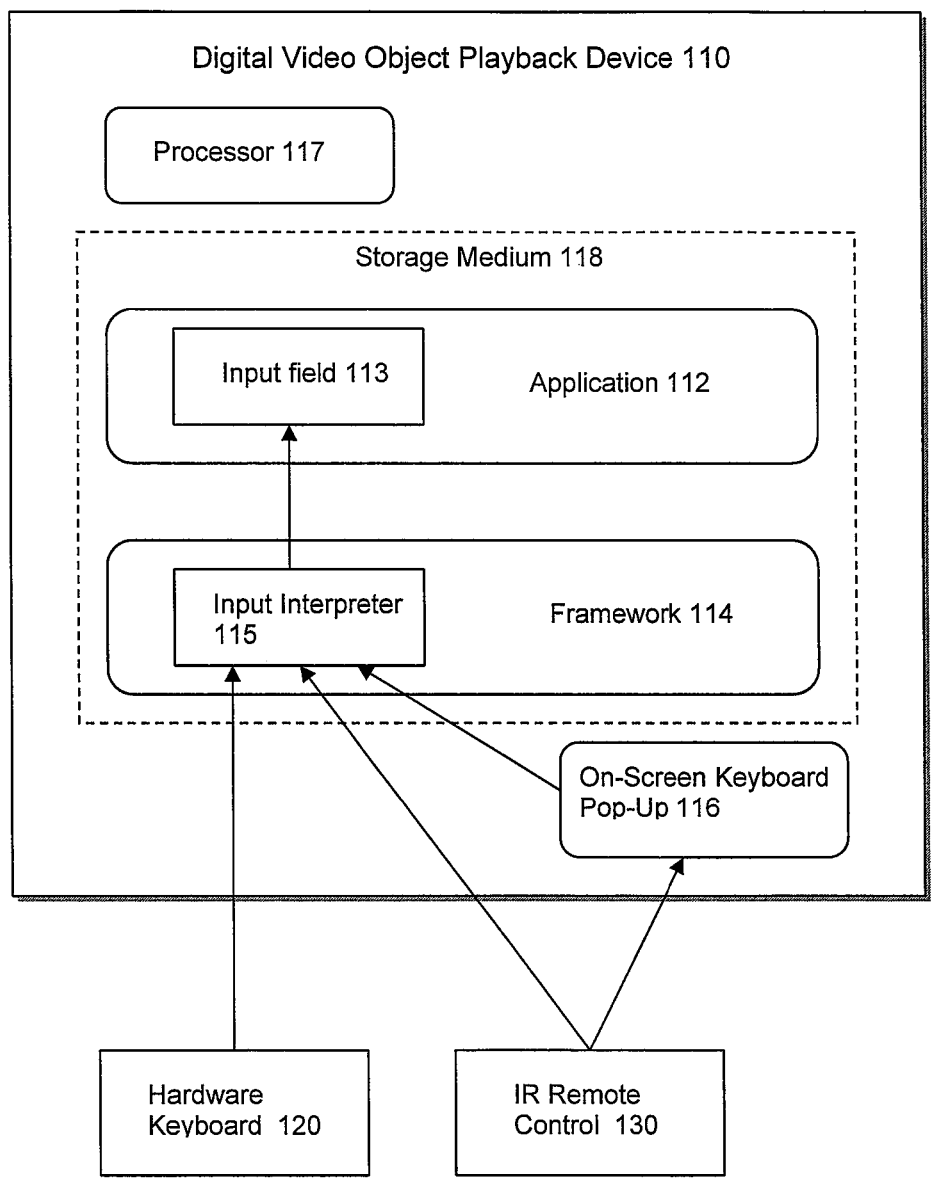
FIG. 1 is a block diagram of an example embodiment of a digital video object playback device.

FIG. 1 is a block diagram of an example embodiment of a digital video object playback device 110. For one example embodiment, digital video object playback device 110 may comprise an optical disk player compatible and/or compliant with the Blu-ray 2.0 format. For one or more embodiments, digital video object playback device 110 may comprise a processor 117 that may execute instructions stored on a storage medium 118. Also for an embodiment, a software framework 114 and a software application 112 may be loaded into playback device 110 and stored in storage medium 118. For one or more embodiments, the framework and application may be bundled with a movie object so that if a movie disk is inserted into playback device 110, the framework and application may be loaded into the playback device storage medium. Also, although storage medium 118 is depicted as comprising a single component, storage medium 118 may comprise one or more storage components. For example, a playback device may comprise a hard disk and may also comprise random access memory. Application 112 and framework 114 may be stored in a single component, or may be divided among a number of storage media.

Framework 114 may comprise, for an example embodiment, one or more software agents for providing basic services such memory management and/or video and/or input/output operations. Further, application 112 may comprise any of a wide range of possible applications. For one example embodiment, application 112 may comprise a messaging application, whereby a user may compose messages and may transmit the messages to other users viewing other playback devices. Other application types may include, to name but one further example, video games.

For the example embodiment depicted in FIG. 1, application 112 may comprise an input field 113 that may accept an input from a user. For example, if application 112 comprises a messaging application, input field 113 may comprise a text entry field for composing a message. As previously mentioned, one or more embodiments may receive any of a variety of input types from a user, including, for example, playback commands, pointing device commands, joystick commands, etc., to name but a few examples.

One or more embodiments may employ an input interpreter agent 115 that may receive user inputs from one or more sources and may process the inputs in a manner that may make the inputs compatible with application 112 and with input field 113. In this manner, there exists a layer of abstraction between input the input sources and the application. By separating the input interpreter from the application, the application need not be aware of all of the various input formats and/or protocols that may exist for the various input sources, and the process of application development may be therefore simplified. Further, as described more fully below, user inputs may be provided by a web service for one or more embodiments, without the application specifically supporting such web services. By separating the input interpreter and the application, it may be easier for application developers to allow for user inputs from a range of sources, including devices external to a playback device.

For one or more example embodiments, input interpreter 115 may receive inputs from a hardware keyboard 120, and/or from an infra-red remote control device 130. Hardware keyboard 120 may be coupled to playback device 110 by way of a hardwired interconnect such as a universal serial bus (USB), for one example, or may be coupled to playback device 110 via a wireless interconnect. Remote control 130 may comprise a typical remote control device that may include a numerical keypad, and/or may include a toggle and/or soft-keys for navigating on-screen menus. For an example embodiment, an on-screen keyboard pop-up software agent 116 may be implemented whereby a user may observe an on-screen keyboard or other input menu and may use the remote control to select various characters and/or symbols, for example. For an embodiment, on-screen keyboard pop-up 116 may receive information from remote control 116 and may deliver input information to input interpreter 115 for eventual delivery to input field 113. For another example embodiment, the on-screen keyboard may be utilized by the user by way of one or more soft-keys on the face of the playback device.

As used herein, the term "video object" is meant to include any digital video content, such as, for merely one example, a movie stored on an optical disk or other medium. For another example, a video object may be streamed or otherwise transmitted over a network connection, such as, for example, an Internet connection.

Also, as used herein, the term "digital video object playback device" is meant to include any electronic device that may process and/or display a video object. For an embodiment, a digital video object playback device may comprise a stand-alone optical video disk player. For another embodiment, a digital video object playback device may comprise a computing platform such as, for example, a laptop computer.

As used herein, the term "software agent" is meant to include any grouping of instructions that may be executed by a processor. Software agents may comprise applications, frameworks, operating systems, interpreters, etc., to name but a few examples.

Figure 2:
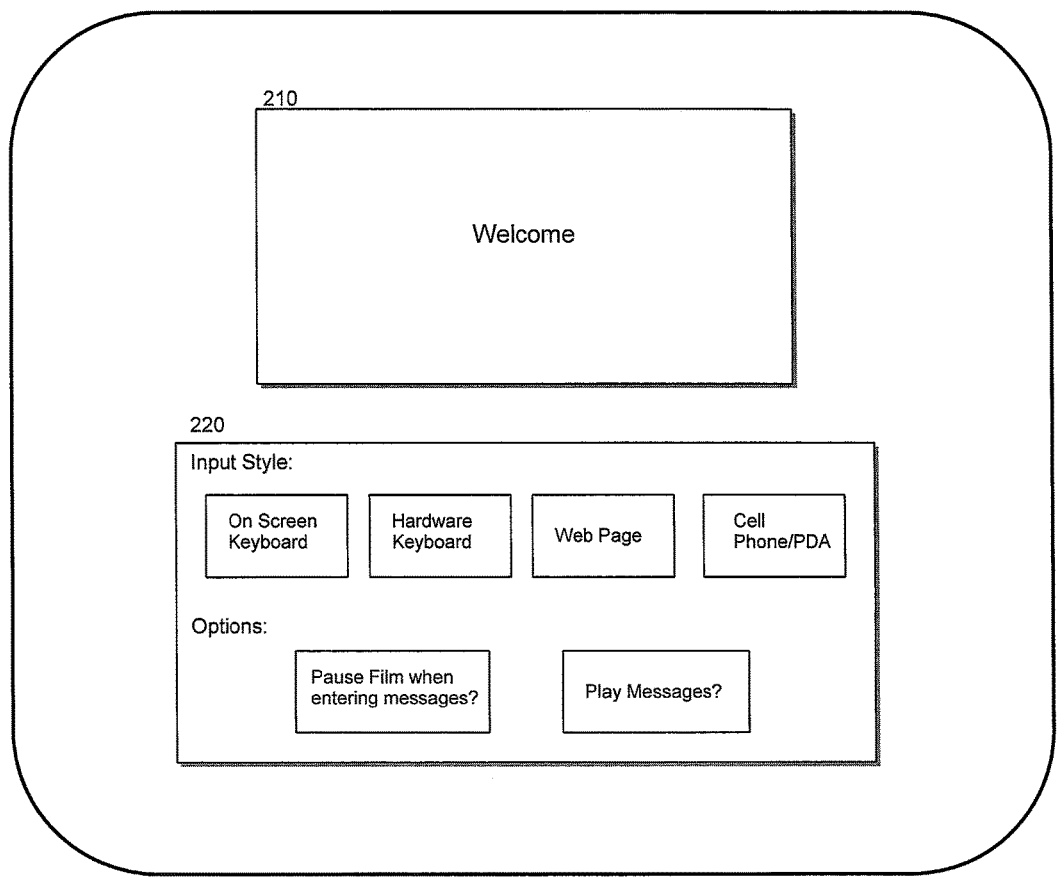
FIG. 2 is an illustration depicting a display of an example introduction and setup screen.

FIG. 2 is an illustration depicting a display of an example introduction and setup screen 200. For an embodiment, screen 200 may be displayed to a user upon initiating play of a video object such as, for this example, a movie stored on a digital video disk. Screen 200 for this example may be associated with a messaging application, although the scope of claimed subject matter is not limited in this respect. Introduction and setup screen 200 may comprise a welcome message 210, which may be configured to communicate any of a wide range of information to the viewer. Also included in screen 200 is a menu 220 by which the user may select, for this example, a desired technique for entering inputs. Among the options for entering inputs for this example are an on-screen keyboard, a hardware keyboard, a web page, and a cell phone and/or personal digital assistant (PDA). For the current example, the on-screen keyboard may be manipulated via a remote control or via some other device. The on-screen keyboard may also be operated by way of one or more soft-keys located on the playback device.

As more fully discussed below, for one or more embodiments, if the user selects the web page option, inputs may be received via an Internet connection. The user may access a web page, perhaps located at a web server for an example embodiment, and the user may enter inputs via the web page. The server may forward the inputs to the video playback device. The text may appear on the screen in real-time for an embodiment, with the text appearing in a message entry area. Similarly, for the cell phone and/or PDA option, the video playback machine may receive inputs from the user by way of a cellular network ultimately coupled to the video playback device, perhaps in an embodiment by way of a server computing platform coupled to the playback device via the Internet. Introduction and setup screen 200 for this example may also comprise options in menu 220 for pausing a film if entering messages, and also for playing messages.

Figure 3:
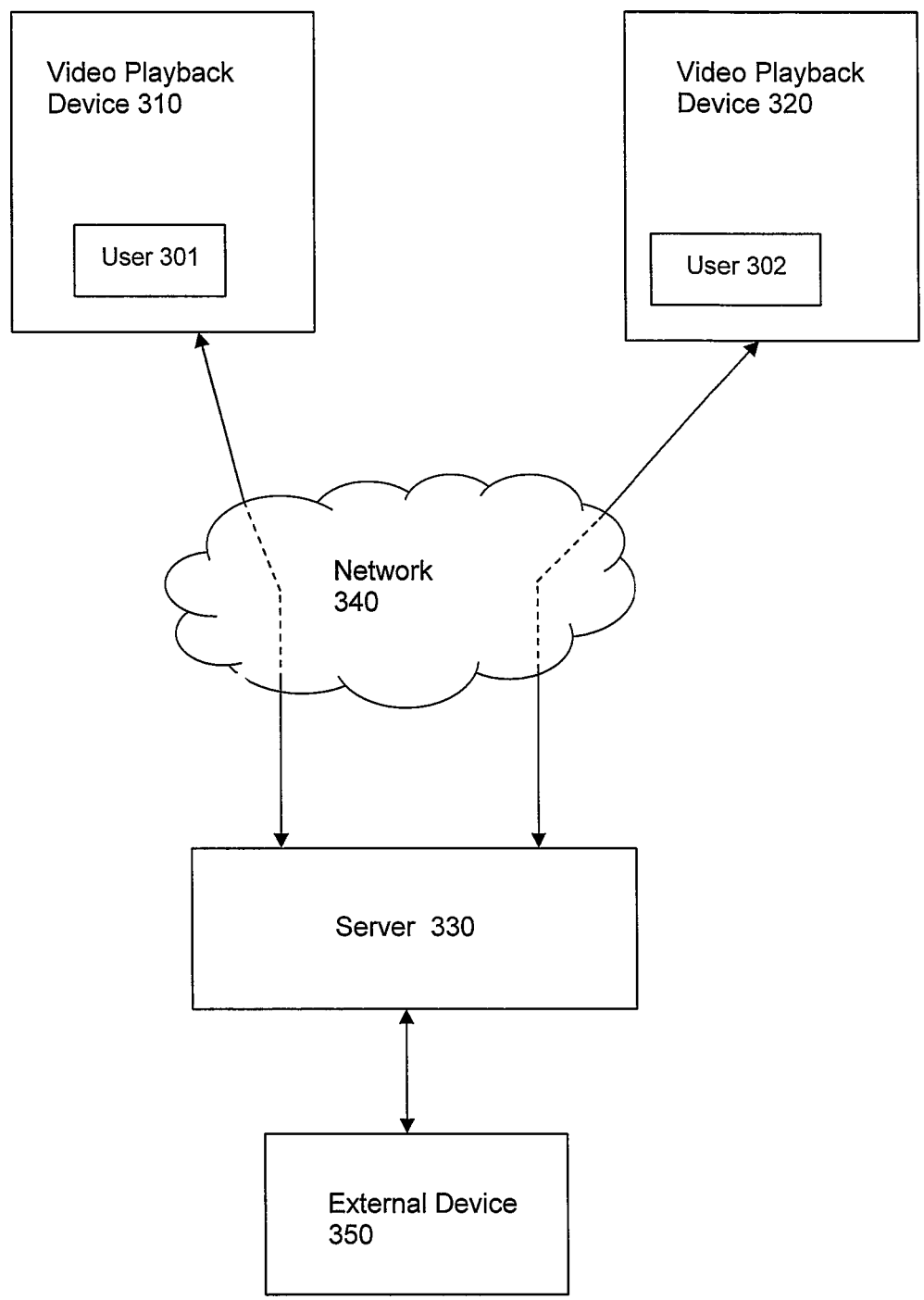
FIG. 3 is a block diagram of an example system including digital video playback devices and an external device coupled to a server computing platform.

FIG. 3 is a block diagram of an example embodiment of a system comprising a video playback device 310 and a video playback device 320 coupled to a server 330 via a network 340. For an embodiment, network 340 may comprise the Internet. In another embodiment, network 340 may comprise a local area network (LAN). Further, in one or more embodiments, network 340 may comprise a wireless network. The system depicted in FIG. 3 may also comprise an external device 350 coupled to server 340.

The system depicted in FIG. 3 is meant to illustrate an example system wherein video playback devices are coupled to a computing platform such as a server. The video playback devices may execute applications that may permit communication among various video playback devices, such as, for example, the messaging application discussed previously. Further, the video playback devices may execute any of a wide range of applications.

For one or more embodiments, and as more fully described below, a user may provide inputs for an application being executed on one or more video playback devices, such as video playback device 310, via an external device such as device 350. The inputs from external device 350 may be transmitted to server 330, and the inputs may subsequently be transmitted to video playback device 310, for example.

As used herein, the term "external device" is meant to include any electronic device capable of executing instructions and transmitting information over a network to a computing platform such as a server. Example types of external devices may include, but are not limited to, cellular phones, personal digital assistants, personal music players, notebook computers, desktop computers, game consoles, portable game systems, etc.

Figure 4:
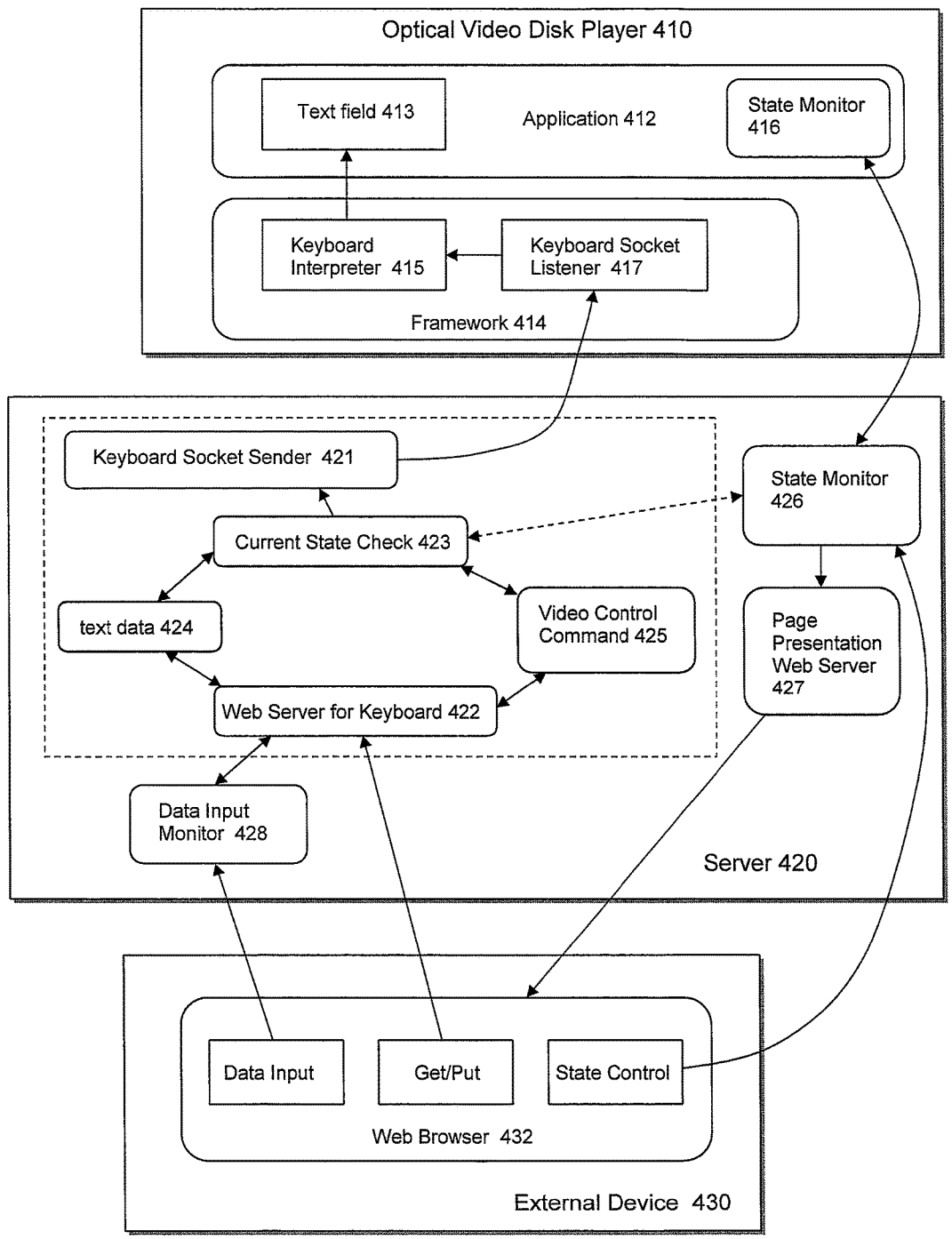
FIG. 4 is an illustration depicting a server computing platform coupled to an optical video disk player and an external device.

FIG. 4 is an illustration of an example system comprising an optical video disk player 410, a server 420, and an external device 430. For this example embodiment, optical video disk player 410 may comprise a digital video object playback device such as device 110 discussed above, although the scope of claimed subject matter is not limited in this respect. As with playback device 110, optical video disk player 410 may include an application 412 and a software framework 414. Application 412 and framework 414 may perform functions similar to application 112 and framework 114 described above. For this example, framework 414 may comprise a keyboard interpreter 415, which may also be referred to as an input interpreter such as, for example, interpreter 115 described above in connection with FIG. 1. Framework 414 for this example may also comprise a keyboard socket listener agent 417 that may receive keyboard input information from server 420. Also for this example embodiment, application 412 may include a text field 413 to receive inputs from keyboard interpreter 415, and may also include a state monitor 416. State monitor 416 for one or more embodiments may comprise a software agent that tracks the state of application 412, including tracking text inputs and/or other input types.

For an embodiment, a page presentation Web server 427 may be implemented at server 420, whereby Web pages related to application 412 may be delivered to external device 430 and displayed by Web browser 432. In this manner, a user may receive information pertinent to application 412, and the user may utilize external device 430 to submit inputs to application 412 by way of server 420.

External device 430 for an embodiment may comprise a cell phone that incorporates a web browser. The user may use a keypad to enter data, whether it be text or other types of information, and the data input may be transmitted to a data input monitor 428 at server 420. State control information may be delivered to state monitor 426, for this example embodiment. The state control information may be associated with Web pages and/or input data related to application 412, for an example.

For an example embodiment, external device 430 may be coupled to server 420 by way of a network such as the Internet, although the scope of claimed subject matter is not limited in this respect. In one or more embodiments, external device 430 may communicate via a cellular network.

At least in part in response to receiving input data from external device 430, data input monitor 428 may deliver the input data to a Web server for keyboard agent 422. Web server 422 may deliver text data 424 and/or video control commands 425 to a keyboard socket sender 421, for one or more embodiments. A current state checker 423 may inform state monitor 426 of the current state of input data received from external device 430. Keyboard socket sender 421 may transmit the input data to keyboard socket listener 417, described above. In this manner, the user may view one or more pages of information relevant to application 412 at external device 430, may provide input data at external device 430 that may be transmitted to optical video disk player 410 by way of server 420. Of course, although the various components of the system depicted in FIG. 4 are described with specific arrangements of software agents and/or components and/or devices, other embodiments are possible that utilize other arrangements of system elements.

As may be seen in the example embodiment depicted in FIG. 4, a layer of abstraction may exist between an input source, in this example external device 430, and application 412. That is, user inputs may be abstracted from a hardware device, and the abstracted inputs may be supplied to application 412. In this manner, any network device such as external device 430 may connect a user to an application executed on a playback device, and the user may provide inputs to the application. For this example embodiment, application 412 need not be aware of the source of the user inputs, because keyboard interpreter 415 and/or other system elements such as keyboard socket listener 417, keyboard socket sender 421, and/or web server for keyboard 422 may ensure that the user input is interpreted and/or format in a manner appropriate for application 412 in general, and for text field 413 in particular. Thus, for the example embodiments described herein, a software based keyboard may be utilized across applications, and a network service such as the web services provided by server 420, for example, may be utilized by a user to provide inputs for the applications. Further, for one or more embodiments, a system-wide state monitor may present appropriate Web pages associated with the applications to the external device, and the user may provide inputs based at least in part on the presented Web pages. Further, the "look and feel" of the presented Web pages may be determined by the application developers, for one embodiment.

Figure 5:
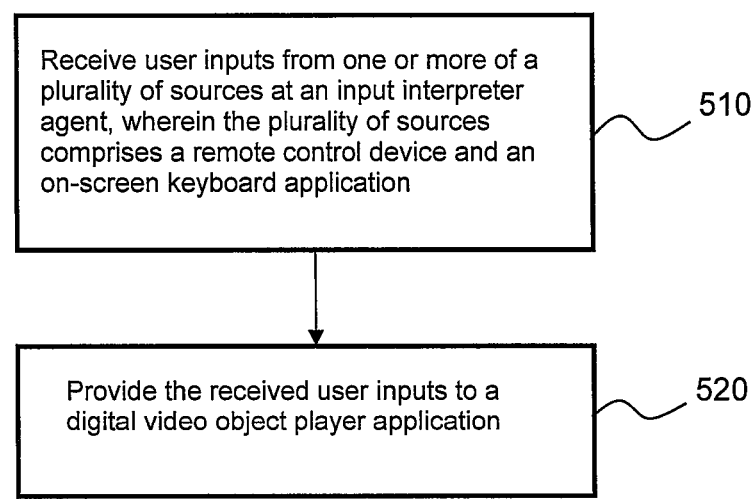
FIG. 5 is a flow diagram of an example embodiment of a method for receiving inputs from a user.

FIG. 5 is a flow diagram of an example embodiment for receiving user inputs. At block 510, inputs may be received at an input interpreter agent from one or more of a plurality of sources, wherein the plurality of sources may comprise a remote control device and an on-screen keyboard application. At block 520, the receive user inputs may be provided to a digital video object player application. Embodiments in accordance with claimed subject matter may include all, less than, or more than blocks 510-520. Further, the order of blocks 510-520 is merely an example order, and these blocks may be performed in a different order.

For one or more embodiments, the plurality of sources may comprise a hardware keyboard, and/or may comprise a computing platform coupled to the digital video object player via a network such as, for one example, the Internet. Of course, other embodiments may include other types of user input sources.

For one or more embodiment, at block 510 the received user inputs may comprise one or more text symbols. Also, for an example embodiment, the one or more text symbols may be applied to a text field in the digital video object application. In a further example embodiment, state information related to the digital video object player application may be reported to a state monitor executed on a server computing platform.

Figure 6:
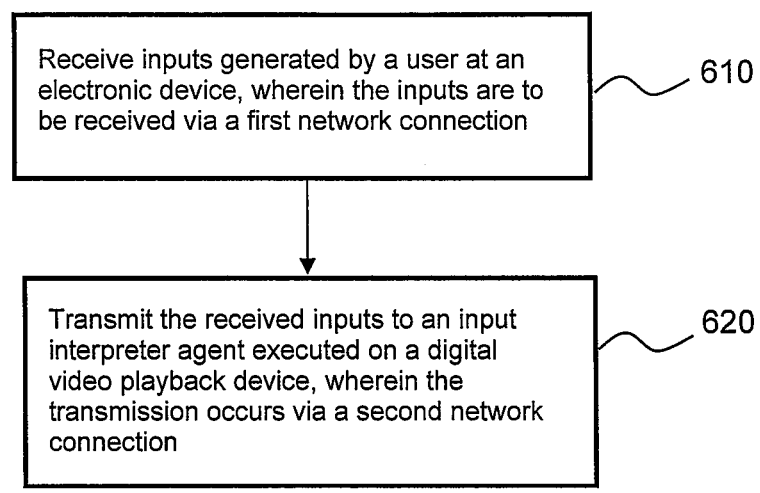
FIG. 6 is a flow diagram of an example embodiment of a method for receiving inputs from a user at an external device and transmitting the inputs to a digital video playback device.

FIG. 6 is a flow diagram of an example embodiment of a method for transmitting received user inputs to a digital video object playback device. At block 610, inputs generated by a user at an electronic device may be received via a first network connection. At block 620, the received inputs may be transmitted to an input interpreter agent executed on the digital video object playback device via a second network connection. Embodiments in accordance with claimed subject matter may include all, less than, or more than blocks 610-620. Further, the order of blocks 610-620 is merely an example order, and these blocks may be performed in a different order.

For an additional example embodiment, state information related to an application executed on the digital video object playback device may be received via the first network connection. The state of the application being executed on the playback device may be tracked based, at least in part, on the received application state information. Also, for an example embodiment, information related to the application may be transmitted to the electronic device, wherein the transmitted information may be based, at least in part, on the tracked state of the application.

As previously mentioned, for one or more embodiments, the external device may comprise any of a range of device types, including, but not limited to, cellular telephone, personal digital assistant, video game console, personal video game player, personal music player, computing platform, etc. As further mentioned previously, the types of user inputs may include, but are not limited to, text, playback commands, joystick commands, pointing device commands, etc.

Figure 7:
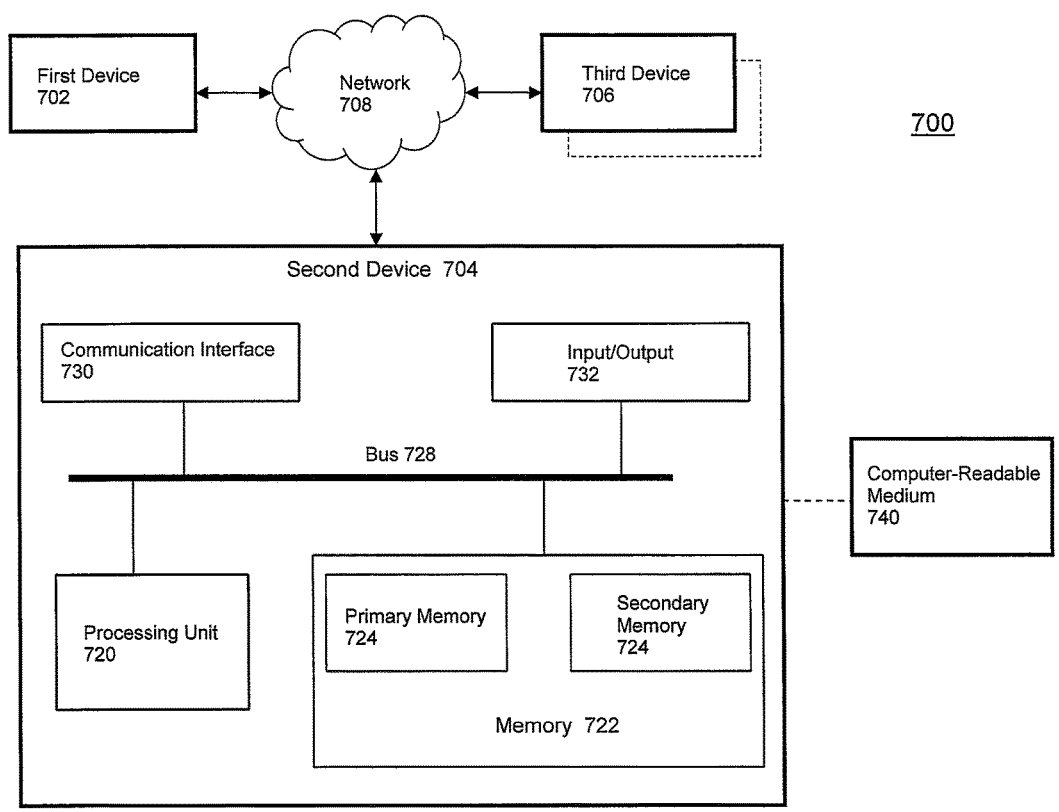
FIG. 7 is a block diagram illustrating an example system comprising a plurality of computing devices coupled via a network in accordance with one or more embodiments.

FIG. 7 is a schematic diagram illustrating an exemplary embodiment of a computing environment system 700 that may include one or more devices configurable to implement techniques and/or processes described above in connection with the creation and/or storage and/or transmission and/or playing of messages discussed above in connection with FIGS. 1-6, for example. System 700 may include, for example, a first device 702, a second device 704, and a third device 706, which may be operatively coupled together through a network 808.

First device 702, second device 704 and third device 706, as shown in FIG. 7, may be representative of any device, appliance or machine that may be configurable to exchange data over network 708. By way of example but not limitation, any of first device 702, second device 704, or third device 706 may include: one or more computing devices and/or platforms, such as, e.g., a desktop computer, a laptop computer, a stand-alone digital video object playback device, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system, a network service provider/system, an Internet or intranet service provider/system, a portal and/or search engine service provider/system, a wireless communication service provider/system; and/or any combination thereof. Of course, any or all of first device, second device, and/or third device may comprise a digital video playback device for one or more embodiments.

Similarly, network 708, as shown in FIG. 7, is representative of one or more communication links, processes, and/or resources configurable to support the exchange of data between at least two of first device 702, second device 704, and third device 706. By way of example but not limitation, network 708 may include wireless and/or wired communication links, telephone or telecommunications systems, data buses or channels, optical fibers, terrestrial or satellite resources, local area networks, wide area networks, intranets, the Internet, routers or switches, and the like, or any combination thereof. As illustrated, for example, by the dashed lined box illustrated as being partially obscured of third device 706, there may be additional like devices operatively coupled to network 708.

It is recognized that all or part of the various devices and networks shown in system 700, and the processes and methods as further described herein, may be implemented using or otherwise include hardware, firmware, software, or any combination thereof.

Thus, by way of example but not limitation, second device 704 may include at least one processing unit 720 that is operatively coupled to a memory 722 through a bus 728.

Processing unit 720 is representative of one or more circuits configurable to perform at least a portion of a data computing procedure or process. By way of example but not limitation, processing unit 720 may include one or more processors, controllers, microprocessors, microcontrollers, application specific integrated circuits, digital signal processors, programmable logic devices, field programmable gate arrays, and the like, or any combination thereof.

Memory 722 is representative of any data storage mechanism. Memory 722 may include, for example, a primary memory 724 and/or a secondary memory 726. Primary memory 724 may include, for example, a random access memory, read only memory, etc. While illustrated in this example as being separate from processing unit 720, it should be understood that all or part of primary memory 724 may be provided within or otherwise co-located/coupled with processing unit 720.

Secondary memory 726 may include, for example, the same or similar type of memory as primary memory and/or one or more data storage devices or systems, such as, for example, a disk drive, an optical disc drive, a tape drive, a solid state memory drive, etc. In certain implementations, secondary memory 726 may be operatively receptive of, or otherwise configurable to couple to, a computer-readable medium 740. Computer-readable medium 740 may include, for example, any medium that can carry and/or make accessible data, code and/or instructions for one or more of the devices in system 700.

Second device 704 may include, for example, a communication interface 730 that provides for or otherwise supports the operative coupling of second device 704 to at least network 708. By way of example but not limitation, communication interface 730 may include a network interface device or card, a modem, a router, a switch, a transceiver, and the like.

Second device 704 may include, for example, an input/output 732. Input/output 732 is representative of one or more devices or features that may be configurable to accept or otherwise introduce human and/or machine inputs, and/or one or more devices or features that may be configurable to deliver or otherwise provide for human and/or machine outputs. By way of example but not limitation, input/output device 732 may include an operatively configured display, speaker, keyboard, mouse, trackball, touch screen, data port, etc.

In the detailed description herein, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

Reference throughout this specification to "one embodiment" or "an embodiment" means that a particular feature, structure, or characteristic described in connection with the embodiment is included in at least one embodiment of claimed subject matter. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

The term "and/or" as referred to herein may mean "and", it may mean "or", it may mean "exclusive-or", it may mean "one", it may mean "some, but not all", it may mean "neither", and/or it may mean "both", although the scope of claimed subject matter is not limited in this respect.

Embodiments claimed may include one or more apparatuses for performing the operations herein. These apparatuses may be specially constructed for the desired purposes, or they may comprise a general purpose computing platform selectively activated and/or reconfigured by a program stored in the device. The processes and/or displays presented herein are not inherently related to any particular computing platform and/or other apparatus. Various general purpose computing platforms may be used with programs in accordance with the teachings herein, or it may prove convenient to construct a more specialized computing platform to perform the desired method. The desired structure for a variety of these computing platforms will appear from the description below.

Embodiments claimed may include algorithms, programs and/or symbolic representations of operations on data bits or binary digital signals within a computer memory capable of performing one or more of the operations described herein. An embodiment may be in hardware, such as implemented to operate on a device or combination of devices, whereas another embodiment may be in software. Likewise, an embodiment may be implemented in firmware, or as any combination of hardware, software, and/or firmware, for example. These algorithmic descriptions and/or representations may include techniques used in the data processing arts to transfer the arrangement of a computing platform, such as a computer, a computing system, an electronic computing device, and/or other information handling system, to operate according to such programs, algorithms, and/or symbolic representations of operations. A program and/or process generally may be considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It has proven convenient at times, principally for reasons of common usage, to refer to these signals as bits, values, elements, symbols, characters, terms, numbers and/or the like. It should be understood, however, that all of these and/or similar terms are to be associated with the appropriate physical quantities and are merely convenient labels applied to these quantities. In addition, embodiments are not described with reference to any particular programming language. It will be appreciated that a variety of programming languages may be used to implement the teachings described herein.

Likewise, although the scope of claimed subject matter is not limited in this respect, one embodiment may comprise one or more articles, such as a storage medium or storage media. This storage media may have stored thereon instructions that if executed by an electronic device, such as a digital video playback device, a computer, a computing platform and/or system, an electronic computing device, a cellular phone, a personal digital assistant, and/or other information handling system, for example, may result in an embodiment of a method in accordance with claimed subject matter being executed, for example. The terms "storage medium" and/or "storage media" as referred to herein relate to media capable of maintaining expressions which are perceivable by one or more machines. For example, a storage medium may comprise one or more storage devices for storing machine-readable instructions and/or information. Such storage devices may comprise any one of several media types including, but not limited to, any type of magnetic storage media, optical storage media, semiconductor storage media, disks, floppy disks, optical disks, CD-ROMs, magnetic-optical disks, read-only memories (ROMs), random access memories (RAMs), electrically programmable read-only memories (EPROMs), electrically erasable and/or programmable read-only memories (EEPROMs), flash memory, magnetic and/or optical cards, and/or any other type of media suitable for storing electronic instructions, and/or capable of being coupled to a system bus for a computing platform. For one or more embodiments, instructions may be stored on an optical video disc such as, for example, a disk compliant with and/or compatible with the Blu-ray format. However, these are merely examples of a storage medium, and the scope of claimed subject matter is not limited in this respect.

The term "instructions" as referred to herein relates to expressions which represent one or more logical operations. For example, instructions may be machine-readable by being interpretable by a machine for executing one or more operations on one or more data objects. However, this is merely an example of instructions, and the scope of claimed subject matter is not limited in this respect. In another example, instructions as referred to herein may relate to encoded commands which are executable by a processor having a command set that includes the encoded commands. Such an instruction may be encoded in the form of a machine language understood by the processor. For an embodiment, instructions may comprise run-time objects, such as, for example, Java and/or Javascript and/or PHP objects. However, these are merely examples of an instruction, and the scope of claimed subject matter is not limited in this respect.

Unless specifically stated otherwise, as apparent from the discussion herein, it is appreciated that throughout this specification discussions utilizing terms such as processing, computing, calculating, selecting, forming, enabling, inhibiting, identifying, initiating, receiving, transmitting, determining, estimating, incorporating, adjusting, modeling, displaying, sorting, applying, varying, delivering, appending, making, presenting, distorting and/or the like refer to the actions and/or processes that may be performed by a computing platform, such as a computer, a computing system, an electronic computing device, and/or other information handling system, that manipulates and/or transforms data represented as physical electronic and/or magnetic quantities and/or other physical quantities within the computing platform's processors, memories, registers, and/or other information storage, transmission, reception and/or display devices. Further, unless specifically stated otherwise, processes described herein, with reference to flow diagrams or otherwise, may also be executed and/or controlled, in whole or in part, by such a computing platform.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

What is claimed is:

1. A method, comprising:
   receiving, at a video object playback device, a physical storage medium, the physical storage medium comprising video content, the physical storage medium further comprising an application and an interpreter agent that are bundled with the video content on the physical storage medium;
   receiving, at the video object playback device from a web server through a network, one or more user inputs for the application via a web service that is incompatible with the application, the one or more user inputs being inputted via a web page associated with the web server;

processing, with the interpreter agent at the video object playback device, the one or more user inputs in a format that is compatible with the application; and executing, with the application at the video object playback device, the one or more user inputs in the format that is compatible with the application.

2. The method of claim 1, wherein the physical storage medium is a digital video disk.

3. The method of claim 1, wherein the one or more user inputs are directly received from an input device.

4. The method of claim 3, wherein the input device is selected from the group consisting of: a remote control, a keyboard, a joystick, and a pointing device.

5. The method of claim 1, wherein the one or more user inputs are received, at the video object player device, from a server through a network, the server receiving the one or more user inputs from an input device.

6. The method of claim 5, wherein the input device is selected from the group consisting of: a telephone, a cellular phone, a personal digital assistant, a personal music player, a notebook computer, a desktop computer, a game console, and a portable game system.

7. The method of claim 1, wherein the application is selected from the group consisting of: a messaging application and a video game application.

8. A computer program product comprising a non-transitory computer readable storage device having a computer readable program stored thereon, wherein the computer readable program when executed on a computer causes the computer to, comprising:

receive, at a video object playback device, a physical storage medium, the physical storage medium comprising video content, the physical storage medium further comprising an application and an interpreter agent that are bundled with the video content on the physical storage medium;

receive, at the video object playback device from a web server through a network, one or more user inputs for the application via a web service that is incompatible with the application, the one or more user inputs being inputted via a web page associated with the web server;

process, with the interpreter agent at the video object playback device, the one or more user inputs in a format that is compatible with the application; and execute, with the application at the video object playback device, the one or more user inputs in the format that is compatible with the application.

9. The computer program product of claim 8, wherein the physical storage medium is a digital video disk.

10. The computer program product of claim 8, wherein the one or more user inputs are directly received from an input device.

11. The computer program product of claim 10, wherein the input device is selected from the group consisting of: a remote control, a keyboard, a joystick, and a pointing device.

12. The computer program product of claim 8, wherein the one or more user inputs are received, at the video object player device, from a server through a network, the server receiving the one or more user inputs from an input device.

13. The computer program product of claim 12, wherein the input device is selected from the group consisting of: a telephone, a cellular phone, a personal digital assistant, a personal music player, a notebook computer, a desktop computer, a game console, and a portable game system.

14. The computer program product of claim 8, wherein the application is selected from the group consisting of: a messaging application and a video game application.

15. An apparatus, comprising:

a storage compartment that receives a physical storage medium, the physical storage medium comprising video content, the physical storage medium further comprising an application and an interpreter agent that are bundled with the video content on the physical storage medium;

a receiver that receives one or more user inputs for the application via a web service that is incompatible with the application, the one or more user inputs being inputted via a web page; and a processor that processes, with the interpreter agent, the one or more user inputs in a format that is compatible with the application and executes, with the application, the one or more user inputs in the format that is compatible with the application.

16. The apparatus of claim 15, wherein the physical storage medium is a digital video disk.

17. The apparatus of claim 15, wherein the one or more user inputs are directly received from an input device.

18. The apparatus of claim 17, wherein the device is selected from the group consisting of: a remote control, a keyboard, a joystick, and a pointing device.

19. The apparatus of claim 15, wherein the one or more user inputs are received, at the video object player device, from a server through a network, the server receiving the one or more inputs from an input device.

20. The apparatus of claim 19, wherein the input device is selected from the group consisting of: a telephone, a cellular phone, a personal digital assistant, a personal music player, a notebook computer, a desktop computer, a game console, and a portable game system.

21. The apparatus of claim 15, wherein the application is selected from the group consisting of: a messaging application and a video game application.

* * * * *